United States Patent [19]

Hengerer et al.

[11] Patent Number: 4,913,749
[45] Date of Patent: Apr. 3, 1990

[54] PROCESS FOR CASE-HARDENING ROLLING BEARING ELEMENTS OF LOW-ALLOY NICKELIFEROUS STEEL

[75] Inventors: Frank Hengerer, Schwebheim; Gerhard Mend, Schweinfurt, both of Fed. Rep. of Germany; Ulf Sjöblom, Göteborg; Roger Björn, Ångered, both of Sweden

[73] Assignee: SKF GmbH, Schweinfurt, Fed. Rep. of Germany

[21] Appl. No.: 297,292

[22] Filed: Jan. 13, 1989

[30] Foreign Application Priority Data

Jan. 14, 1988 [DE] Fed. Rep. of Germany ....... 3800838

[51] Int. Cl.⁴ .............................................. C21D 1/74
[52] U.S. Cl. .................................... 148/16 S; 148/16; 148/319
[58] Field of Search .......................... 148/16 S, 16, 319

[56] References Cited

U.S. PATENT DOCUMENTS 3,737,204 6/1973 Burkhardt ........................... 384/569

FOREIGN PATENT DOCUMENTS 63-18018 1/1988 Japan .
436894 12/1974 U.S.S.R. ............................ 148/16 S
582304 11/1977 U.S.S.R. ............................ 148/16 S

*Primary Examiner*—Deborah Yee
*Attorney, Agent, or Firm*—Rosen, Dainow & Jacobs

[57] ABSTRACT

In a process for case-hardening rolling bearing elements of low-alloy nickeliferous steel, the rolling bearing elements are carburized in a dissociating carburizing gas, cooled down, heated to hardening temperature, austenitized in the carburized layer and, lastly, quenched.

So that no brittleness of the rolling bearing elements takes place upon carburization due to dissociated hydrogen, the bearing elements are cooled from carburizing heat down to about 300° C. in agitated inert gas and then held at this temperature, so that sufficient dissociated hydrogen escapes from the carburized layer of the rolling bearing elements. Subsequent heating of the said elements to hardening temperature or to intermediate annealing temperature is advantageously effected after holding at 300° C.

11 Claims, 3 Drawing Sheets

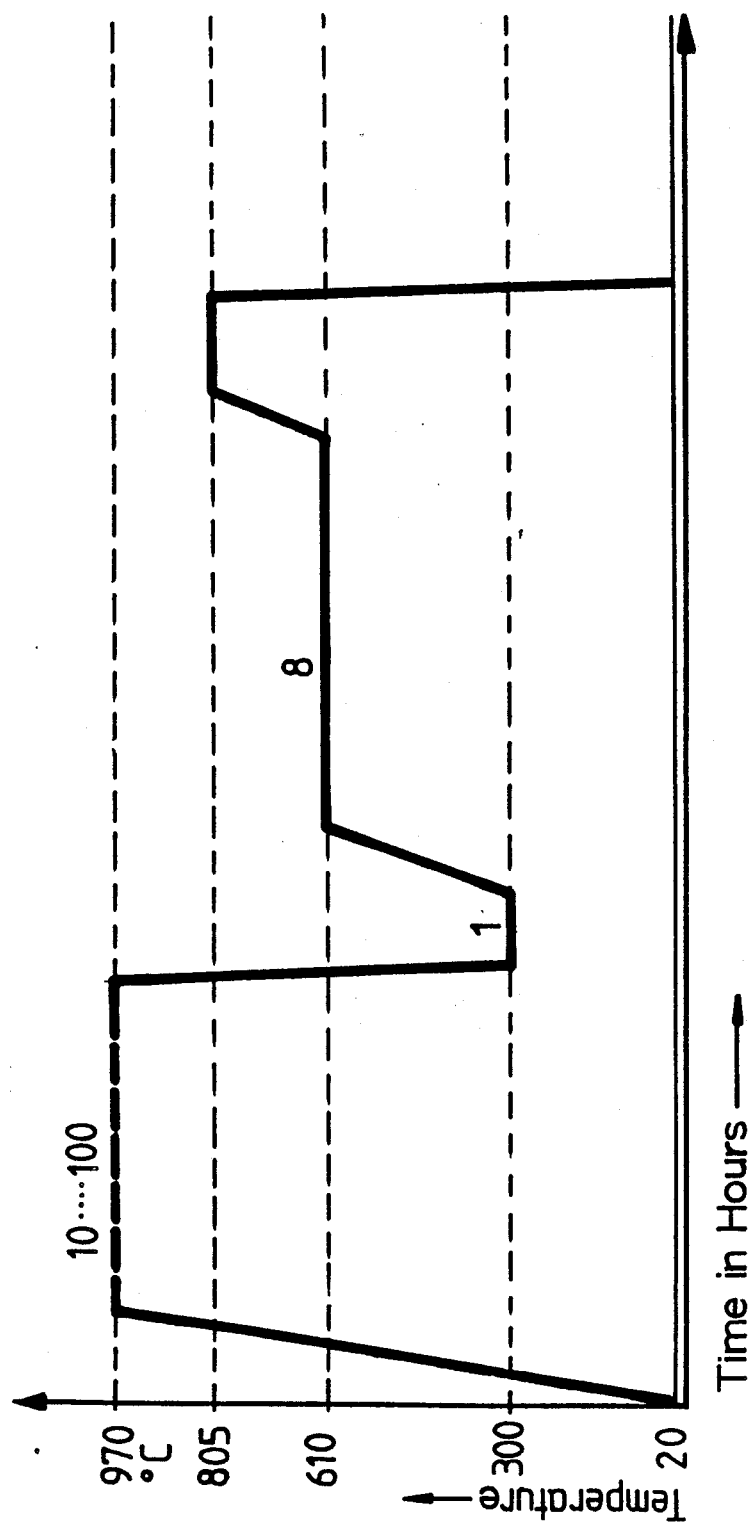

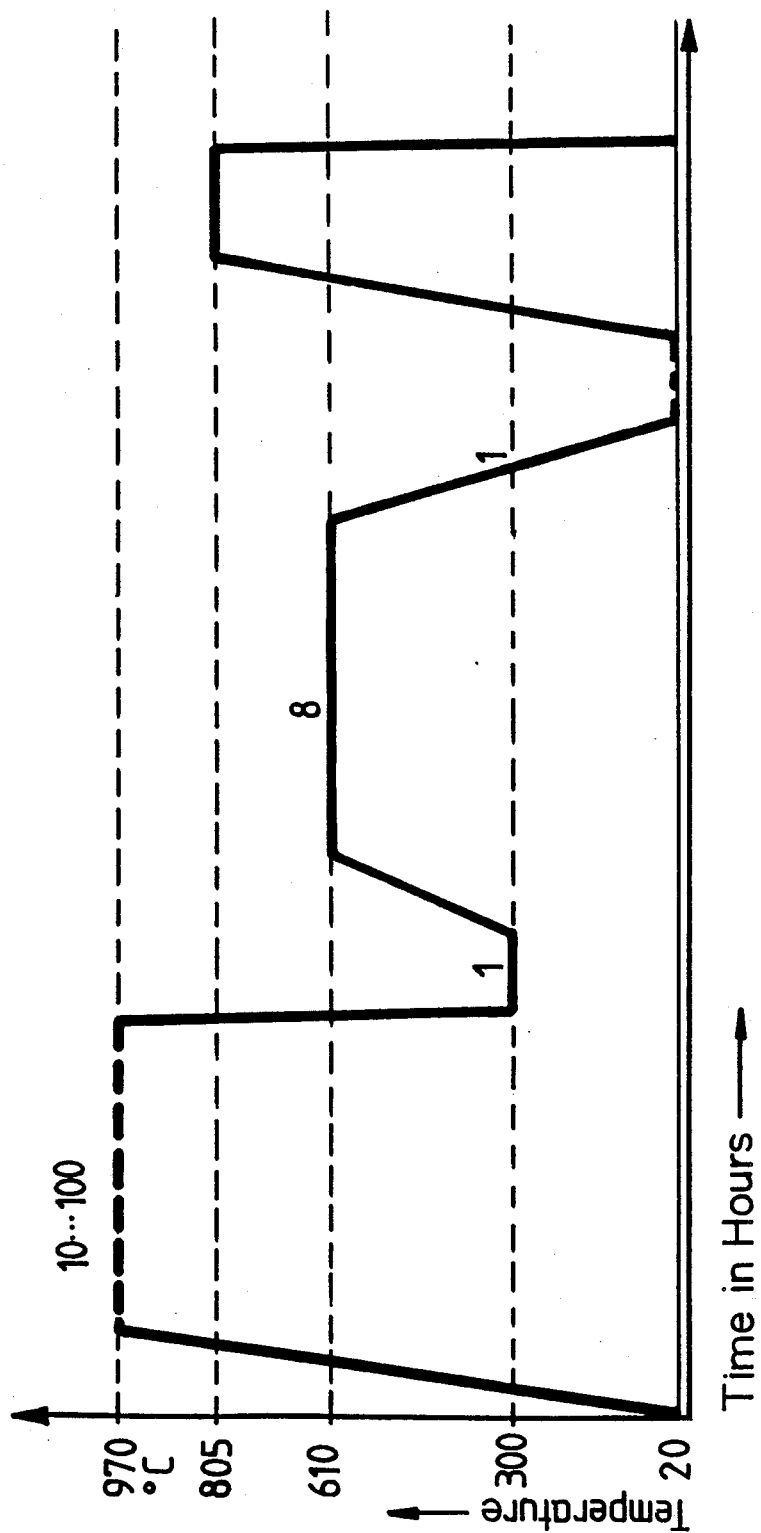

PROCESS FOR CASE-HARDENING ROLLING BEARING ELEMENTS OF LOW-ALLOY NICKELIFEROUS STEEL

BACKGROUND OF THE INVENTION

1. Field of the invention

The present invention relates to a process for case-hardening or carburizing rolling bearing elements of low-alloy nickeliferous steel. In particular, the process of the present invention comprises the steps of producing a carburized layer by holding said rolling bearing elements in a carburizing furnace at a carburizing temperature of about 970° C. in the presence of a carburizing gas which dissociates into carbon and hydrogen; cooling said rolling bearing elements; heating said cooled rolling bearing elements to hardening temperature; austenitizing said rolling bearing elements in the carburization layer; and quenching said austenitized rolling bearing elements to obtain a surface hardness of 60 to 64 RHC.

So that no brittleness of the rolling bearing elements takes place upon carburization due to dissociated hydrogen, the rolling bearing elements are cooled from the carburizing temperature of about 970° C. down to a temperature of about 300° C. in the presence of an agitated inert gas and then held at this temperature in the presence of said inert gas. The rate of cooling is such as to prevent precipitation of intercrystalline carbides in the steel structure and to cause a great deal, i.e., a substantial amount, of the dissociated hydrogen to diffuse out of the carburized layer of the rolling bearing elements. Subsequent heating of the said elements to hardening temperature or to intermediate annealing temperature is advantageously effected after holding at 300° C.

2. Description of the prior art

Highly stressed rolling bearing elements, for example, large rolling bearing races for rolling mills, are frequently made of a low-alloy nickeliferous steel which is surface hardened by the case-hardening process. In this connection, after carburization and before austenitization of the carburized layer of the rolling bearing elements, intermediate annealing is often necessary for homogenizing the grain structure of the steel and for reducing internal stresses.

In a known process (U.S. Pat. No. 3,737,204) for case-hardening rolling bearing elements of the type mentioned, the rolling bearing elements, after carburization in propane gas, are slowly cooled down to room temperature, so that some of the hydrogen absorbed into the carburized layer due to dissociation of the propane gas during carburization is able to diffuse out of the carburized layer. This cooling, however, should not proceed too slowly, because otherwise intercrystalline carbides precipitate in the structure of the carbonized layer. Such precipitation alters the hardness structure and considerably reduces the rolling fatigue service life of the rolling bearing elements, for example, rolling bearing races.

In the known process some atomic and molecular hydrogen still remains in the carburized layer. In steels containing nickel, this hydrogen causes brittleness of the hardened structure of rolling bearing elements, which may lead to hazardous crack formation.

SUMMARY AND OBJECTS OF THE INVENTION

As opposed to the prior art, an object of the present invention is to provide a process for case-hardening rolling bearing elements, in particular large rolling bearing races, of nickeliferous low-alloy steels of the type indicated wherein brittleness of the hardened structure of rolling bearing elements due to the dissociated hydrogen of the carburizing gas is largely avoided. In addition, the process is designed to be applicable industrially.

In the process pursuant to the invention the rolling bearing elements are cooled off after carburization in the presence of an agitated inert gas, for example, nitrogen. The inert gas acts as a protective gas so that the rolling bearing elements suffer no oxidation and no decarburization on their surfaces. Due to the motion of the agitated inert gas, cooling of the rolling bearing elements proceeds at a rate just fast enough to prevent precipitation of intercrystalline carbides but sufficiently slowly so cooling takes place within a certain cooling period and a great deal of the hydrogen of the carburizing agent absorbed into the carburized layer during carburization is able to diffuse out of the carburized layer.

In this way, it is necessary to maintain a temperature of about 300° C. for only a relatively short time to allow the residue of hydrogen still remaining in the carburized layer to diffuse out.

As an exceptionally brief heat-treatment time is required for the removal of hydrogen from the carburized layer, the process pursuant to this invention is particularly applicable industrially, with little expenditure of time and energy required.

BRIEF DESCRIPTION OF THE DRAWINGS

Further objects and advantages of the invention will appear from the following description as well as from the accompanying drawings which illustrate process routines pursuant to this invention. It will be understood that the invention is not limited to the embodiments described and that the drawings are for purposes of illustration only and are not intended as a definition of the limits of the invention.

FIG. 2 is a graph illustrating the process routines employed in a second embodiment of this invention.

FIG. 3 is a graph illustrating the process routines employed in a third embodiment of this invention.

DETAILED DESCRIPTION OF THE PREFERRED EMBODIMENTS

Figure 1:
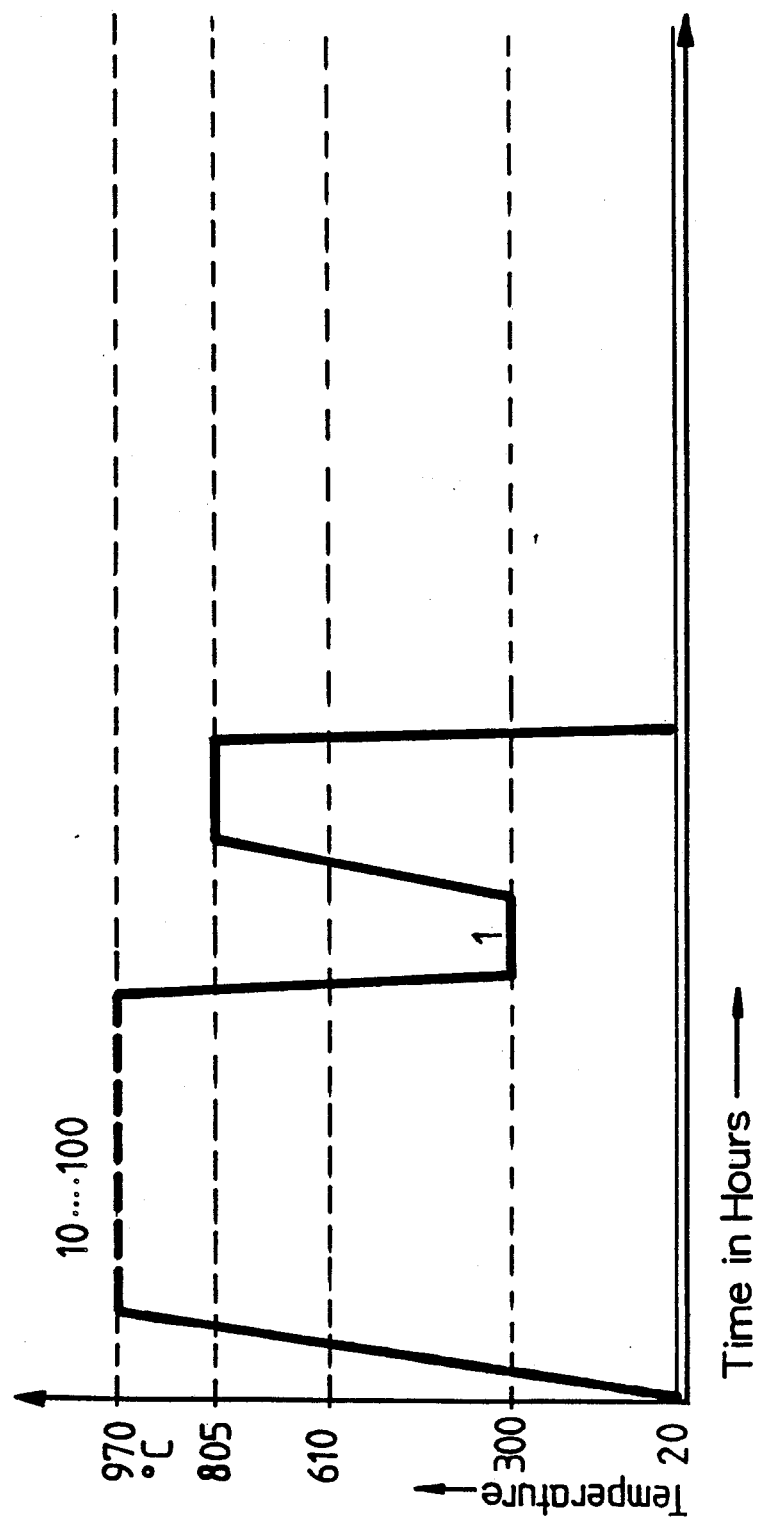
FIG. 1 is a graph illustrating the process routines employed in one embodiment of this invention.

A steel obtainable on the market, for example, 17 NiCrMo 14, may be used for the process of this invention. This steel is particularly suitable for producing rolling bearing elements, for example, large rolling bearing races. This steel has the reduced values customary for rolling bearing steels of S=0.035% and P=0.035%. The other analytical values (%) of this steel are:

| | |
|---|---|
| C | 0.15–0.20 |
| Ni | 3.25–3.75 |
| Cr | 1.30–1.60 |
| Mo | 0.15–0.25 |

| -continued | |
|---|---|
| Mn | 0.40–0.70 |

All figures are percentage by weight with the balance iron and impurities due to melting.

Rolling bearing races made of this steel are carburized at about 970° C. To this end, the rolling bearing races are brought, individually or in groups, into a carburizing furnace, which works with propane gas (C₃H₄) as carburizing agent, and heated to 970° C. To produce a sufficiently thick carburized layer, the bearing races are then kept in the carburizing furnace at 970° C. for 10 to 20 hours. Propane gas then penetrates into the surface of the races and, in a manner known per se, produces carbon and hydrogen as products of decomposition.

Instead of propane gas as the carburizing agent, another gas which upon carburization liberates carbon and hydrogen, for example, methane (CH₄), may be used.

As indicated in FIG. 1, in further heat treatment the rolling bearing elements in the carburizing furnace are cooled from the carburization temperature down to about 300° C. in the presence of an agitated inert gas, such as nitrogen, so that precipitation of intercrystalline carbides in the structure of the steel is prevented and, in addition, sufficient cooling time remains so that some of the dissociated hydrogen of the carburizing gas diffuses out of the carburized layer. The races are then held at about 300° C. in the carburizing furnace, with a dwell time of at least 1 hour, in the presence of the inert gas, so that more of the dissociated hydrogen escapes from the carburization layer. Immediately after being held at 300° C. in the carburization furnace, the rolling bearing elements are heated to a hardening temperature of about 805° C., austenitized at this hardening temperature and then quenched to room temperature in air, oil or salt to obtain a surface hardness of 60 to 64 RHC.

Holding the rolling bearing elements at about 300° C. avoids or minimizes the risk of crack formation in the rolling bearing elements as the residue of dissociated hydrogen remaining from the carburization heat after cooling diffuses out of the carburized layer of the rolling bearing elements.

Immediately after holding at 300° C., the rolling bearing elements are heated from 300° C. to a hardening temperature of about 805° C. Thus, only a small amount of thermal energy is required to accomplish the process of the present invention since in heating the bearing elements up to hardening temperature, one need heat only from 300° C. to hardening temperature.

As indicated in FIG. 2, in large rolling bearing races it is advisable to have an intermediate annealing following cooling and holding at 300° C. Immediately after holding at about 300° C., the rolling bearing elements are heated from 300° C. up to about 610° C. and intermediate annealing is effected. This causes the steel structure of the rolling bearing elements to become stress-free and homogeneous. This is important, especially in large rolling bearing races, because after cooling down from the carburization temperature these may exhibit considerable residual stress. This intermediate annealing is best effected with a dwell time of 8 hours, which results in an economically reasonable heat-treatment time. One may then heat directly from intermediate annealing temperature (610° C.) to hardening temperature (about 805° C). Heating to hardening temperature and hardening of the rolling bearing races may proceed in the adequately heatable carburizing furnace, so that the bearing races, often heavy, do not have to be transported to another furnace, for example, an annealing furnace or hardening furnace, during the heat treatment. In this embodiment of this invention, cooling down to room temperature (20° C.) does not take place after intermediate annealing and thus, a relatively smaller thermal energy requirement is ensured. In this embodiment, as indicated in FIG. 2, immediately after intermediate annealing the rolling bearing elements are heated from 610° C. to a hardening temperature of about 805° C. and austenitization is effected at this temperature. The rolling bearing elements are then quenched to room temperature in air, oil or salt to obtain a surface hardness of 60 to 64 RHC.

Alternatively, in another embodiment of this invention indicated in FIG. 3, slow cooling of the rolling bearing elements from 610° C. down to room temperature (20° C.) takes place in air or nitrogen after intermediate annealing is effected. This advantageously allows the relatively soft rolling bearing elements to be machined after carburization and before hardening and austenitization of the carburized layer. In this embodiment, additional dissociated hydrogen is then released from the carburized layer. The time for cooling to room temperature (20° C.) amounts to about one hour. After intermediate processing the rolling bearing races are brought from room temperature (20° C.) to hardening temperature (about 805° C.), hardened, austenitized and quenched in air, oil or salt.

One more tempering is usually provided after hardening, so that the rolling bearing elements receive a martensitic texture, which imparts a hardness of 58 to 62 RHC to the bearing surface of the roller bearing.

Lastly, the rolling bearing elements are finish-ground and, if necessary, further honed or polished on their bearing surface.

Advantageously, all stages of treatment, from carburization to intermediate annealing, take place in the same furnace and under nitrogen as the protective gas. Thus, the steps of cooling after carburization, holding the rolling bearing elements at 300° C., heating to 610° C. and intermediate annealing at 610° C. is effected in the presence of an inert gas, such as nitrogen, in an adequately heatable carburizing furnace which is capable of being changed over to a nitrogen atmosphere.

Heating to hardening temperature and austenitization of the rolling bearing elements likewise takes place in the same adequately heatable carburizing furnace. Thus, according to the invention, it is possible to effect hardening in the same furnace used for carburization, so that an extremely economical heat treatment of the rolling bearing elements is obtained in auto mated serial or mass production.

While a number of embodiments of the invention have been shown and described, it will be obvious to one skilled in the art that many changes and modifications may be made thereto without departing from the spirit and scope of the invention.

We claim:

1. In a process for case-hardening rolling bearing elements of low-alloy nickeliferous steel, comprising the steps of producing a carburized layer by holding said rolling bearing elements in a carburizing furnace at a carburizing temperature of about 970° C. in the presence of a carburizing gas which dissociates into carbon and hydrogen; cooling said rolling bearing elements;

heating said cooled rolling bearing elements to hardening temperature; austenitizing said rolling bearing elements in the carburization layer; and quenching said austenitized rolling bearing elements to obtain a surface hardness of 60 to 64 RHC, the improvement wherein the step of cooling comprises cooling said rolling bearing elements from the carburizing temperature down to a temperature of about 300° C. in the presence of an agitated inert gas at a cooling rate which prevents precipitation of intercrystalline carbides in the steel structure and holding said rolling bearing elements at said temperature of about 300° C. in the presence of said inert gas so as to diffuse additional hydrogen out of said carburization layer, whereby said cooling rate allows a substantial amount of the dissociated hydrogen of the carburizing gas to diffuse out of said carburized layer.

2. A process according to claim 1 wherein holding of said rolling bearing elements takes place at a temperature of about 300° C., with a dwell time of at least one hour.

3. A process according to claim 1 or 2 wherein immediately after holding at a temperature of about 300° C., said rolling bearing elements are heated to a hardening temperature of about 805° C.

4. A process according to claim 1 wherein immediately after holding at a temperature of about 300° C., heating from this temperature to a temperature of about 610° C. takes place and intermediate annealing is effected.

5. A process according to claim 4 wherein immediately after intermediate annealing, heating of said rolling bearing elements from 610° C. to a hardening temperature of about 805° C. takes place whereby austenitization is effected.

6. A process according to claim 4, characterized in that after intermediate annealing, slow cooling of said rolling bearing elements from 610° C. to room temperature of about 20° C. takes place in air.

7. A process according to any of claims 4, 5 or 6, characterized in that intermediate annealing of said rolling bearing elements takes place, with a dwell time of up to 8 hours.

8. A process according to any of the preceding claims 4 to 6 wherein the steps of cooling after carburization, holding at 300° C., heating to 610° C. and intermediate annealing at 610° C. is effected in the presence of nitrogen as said inert gas in a carburizing furnace capable of being changed over to nitrogen atmosphere.

9. A process according to claim 3 wherein heating to hardening temperature and austenitization of said rolling bearing elements takes place in a carburizing furnace.

10. A process according to claim 1, wherein a steel with the following analytical values (%) is used:

| | |
|---|---|
| C | 0.15–0.20 |
| Ni | 3.25–3.75 |
| Cr | 1.30–1.60 |
| Mo | 0.15–0.25 |
| Mn | 0.40–0.70 |
| S | max. 0.035 |
| P | max. 0.035 |

Remainder iron and impurities due to melting

11. A process according to claim 1 wherein said carburizing gas comprises propane or methane gas.

* * * * *